US007042366B1

(12) United States Patent
Mui et al.

(10) Patent No.: US 7,042,366 B1
(45) Date of Patent: May 9, 2006

(54) USE OF REMOTE CONTROLS FOR AUDIO-VIDEO EQUIPMENT TO CONTROL OTHER DEVICES

(75) Inventors: Daniel Mui, Campbell, CA (US); Alexander Marquez, Felton, CA (US)

(73) Assignee: ZiLOG, Inc., San Jose, CA (US)

( * ) Notice: Subject to any disclaimer, the term of this patent is extended or adjusted under 35 U.S.C. 154(b) by 377 days.

(21) Appl. No.: 09/655,733

(22) Filed: Sep. 6, 2000

(51) Int. Cl.
*H04Q 11/00* (2006.01)

(52) U.S. Cl. .......................... 340/825.25; 340/825.22; 340/825.72; 340/825.69; 340/5.61; 340/5.64; 340/5.74; 341/176

(58) Field of Classification Search ........... 340/825.25, 340/825.22, 825.69, 825.72, 5.61, 5.64, 5.74, 340/539; 348/734; 446/549; 341/176; 359/142, 359/146, 148
See application file for complete search history.

(56) References Cited

U.S. PATENT DOCUMENTS 4,754,133 A 6/1988 Bleich
4,807,052 A * 2/1989 Amano ........................ 348/734
4,905,279 A * 2/1990 Nishio ........................... 380/9
5,024,626 A 6/1991 Robbins et al.
5,233,646 A 8/1993 Kuromi
5,254,028 A 10/1993 Liao
5,349,639 A * 9/1994 Goodrich .................... 379/373
5,386,251 A * 1/1995 Movshovich ............... 348/734
5,782,036 A * 7/1998 Bertieri et al. ................. 49/25
5,873,765 A 2/1999 Rifkin et al.
5,963,624 A * 10/1999 Pope ..................... 379/110.01
6,046,670 A 4/2000 Martin
6,309,275 B1 * 10/2001 Fong et al. ................. 446/297

FOREIGN PATENT DOCUMENTS

GB 2-336-701 A 10/1999
JP 7008631 A 1/1995
JP 2000-61133 2/2000

* cited by examiner

*Primary Examiner*—Michael Horabik
*Assistant Examiner*—Vernal Brown
(74) *Attorney, Agent, or Firm*—Parsons Hsue & de Runtz LLP

(57) ABSTRACT

Remote controls sold with various audio-video equipment, such as televisions, audio amplifiers, tape players and disc players, are used to control other types of devices, such as toys and home appliances. In order to accommodate different brands of remote controls that emit infra-red control signals according to different protocols, the controlled device that is not audio-video equipment includes a universal decoder that recognizes and decodes a variety of such signals. In a preferred embodiment, the same control function that is specified for one or more keys of a remote control is carried out in the controlled device. As examples, a sound source in the controlled device is muted when a mute button of any one of many different brands of remote controls is pushed, and/or the volume of the sound source is increased and decreased when volume-up and volume-down buttons, respectively, are pushed. When a television, or other piece of audio-video equipment, and a toy or home appliance, or other type of device that emits sounds, are both within range of the audio-video equipment remote control, the sound of both is controlled at the same time.

8 Claims, 4 Drawing Sheets

USE OF REMOTE CONTROLS FOR AUDIO-VIDEO EQUIPMENT TO CONTROL OTHER DEVICES

BACKGROUND OF THE INVENTION

The present invention relates generally to the wireless remote control of electronic devices, and, more specifically, to the use of remote controls designed for use with various audio-video equipment to also control other types of devices.

The use of wireless remote controls to communicate with host audio-video equipment, such as televisions, audio amplifiers, tape players, video players, satellite receivers, and similar items, is very popular. The typical remote control emits an infra-red radiation signal that has been encoded in some way to designate the various key functions. That signal is then received and decoded by a piece of audio-video equipment, which, in response, performs the commanded function. Different manufacturers utilize different infra-red signal protocols and encoding patterns to command the same functions. For example, the infra-red signal used to mute the audio output of one brand of television is different from, and incompatible with, the infra-red signal used to mute the audio output of another brand of television. So pushing the "mute" key on the remote of one manufacturer is likely not to mute the sound of the other manufacturer's television.

There are many different infra-red signal protocols that are used by various audio-video equipment manufacturers. In the most common types of infra-red signals used by United States manufacturers, a carrier signal, generally within a range of from 19 kHz. to 120 kHz., is modulated into pulses. This is termed Constant Carrier Modulation (CCM). There are several versions of this signal type. In one version, the command being transmitted is designated by the position of the pulses with respect to each other, which is termed Pulse Position Modulation (PPM). In another version of a CCM signal, relative widths of the pulses carries the command information, termed Pulse Width Modulation (PWM). But even when two manufacturers use the same protocol, such as the popular PPM, they most likely will designate different pulse patterns to be generated when corresponding functional keys on their remote controls are pushed. For example, the encoding pattern used by one manufacturer to mute the sound of its equipment is different than that used by another manufacturer, even though both use the PPM protocol.

And there are even more signal protocols that are used by other manufacturers, each of which provides numerous possibilities of specific signal encoding patterns that correspond to designated key command functions. One other protocol is base band pulsing, where signals are transmitted without a carrier. Either the positions of the pulses or their widths can be used to carry the command information, and, as a result, can look similar to CCM encoded signals. Another protocol is Frequency Shift Keying (FSK), wherein each key on the remote control transmits a different frequency carrier signal. No pulses are utilized. Because of such numerous possibilities for the infra-red signals, universal remote controls are popular consumer items. A universal remote control is capable of generating many different infra-red signals for each of the numerous key functions according to the protocols and encoding patterns used by various manufacturers. This allows a consumer to use a single universal remote to control several pieces of audio-video equipment of different manufactures.

SUMMARY OF THE INVENTION

Briefly and generally, devices other than audio-video equipment are controlled to perform one or more specified key functions from any of a number of manufacturers' audio-video equipment remote controls having different infra-red signal protocols and/or encoding patterns. A universal receiver identifies the protocol and encoding pattern of a received infra-red signal by comparing its characteristics with stored data of the most commonly used schemes, and then causes the device to perform the function of the pushed remote key that generated the signal. An example use is to operate the sound control keys of a remote, such as the mute, volume-up or volume-down keys, to cause sound emitted by the device other than a piece of audio-video equipment to be muted, raised in volume or lowered in volume, respectively. If both the device and the piece of audio-video equipment with which the remote was designed to operate are within the range of the remote control, such as being located in the same room, the sound of both can be controlled in the same manner at the same time. This allows, for example, various sources of sound in a room to be simultaneously muted by pressing the mute button on a single remote control. Examples of such non-audio/video devices include toys, musical keyboards and other musical synthesizers, personal computer multi-media systems and home appliances that generate sound.

In one embodiment, a device other than audio-video equipment comprises a receiver and a decoder. The receiver receives wireless control signals of the type emitted by a plurality of remote controls that individually emit their control signals with a different one of a plurality of distinct signal protocols to specify individual functions to be performed by different types of audio-video equipment that individually respond to one of the plurality of protocols. The decoder is connected to the receiver to identify one of the plurality of signal protocols for a received control signal from a specific remote control and to decode therefrom the function represented thereby. The decoded function is performed within the device. In one example, the wireless control signals include infra-red radiation pulses.

Another embodiment is a toy that comprises a sound generator, a receiver and a decoder. The receiver receives wireless control signals of the type emitted by a plurality of remote controls that individually emit their control signals with a different one of a plurality of distinct protocols to specify individual functions to be performed by different types of audio-video equipment that individually respond to one of the plurality of protocols. The individual functions include a function of muting a sound output of the corresponding piece of audio-video equipment. The decoder is connected to the receiver to identify one of the plurality of signal protocols of a received control signal from a specific remote control, and to decode therefrom the muting function represented thereby. In response, the decoder mutes the toy sound generator.

Yet another embodiment comprises a photo-detector, a memory and a micro-controller. The photo-detector is adapted to receive infra-red radiation and generate an electrical signal proportional thereto. The memory stores identification data of each of a plurality of infra-red functions within the individual infra-red signal protocols for which identification data is stored. The plurality of infra-red protocols and control function signal patterns are those of a plurality of remote controls for a corresponding plurality of types of audio-video equipment. The micro-controller compares the photo-detector electrical signal with the memory data for decoding a received infra-red radiation signal to identify the infra-red signal protocol and control function. The embodiment also includes a device that is controlled in accordance with the decoded control function.

Additional features, advantages and objects of the various aspects of the present invention are included in the following description of exemplary embodiments, which description should be taken in conjunction with the accompanying drawings.

DESCRIPTION OF EXEMPLARY EMBODIMENTS

Figure 1:
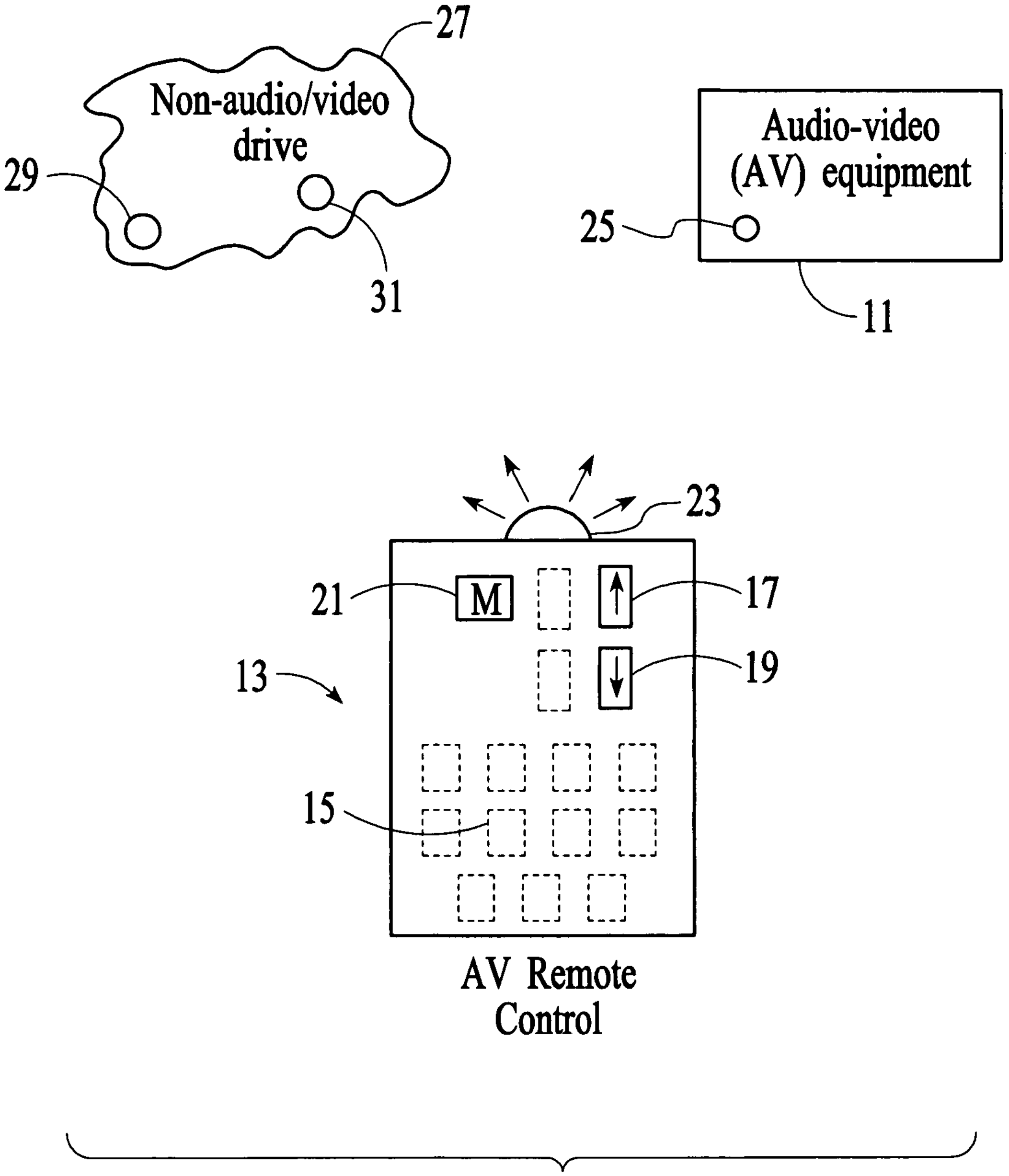
FIG. 1 illustrates the use of a single wireless remote control to simultaneously operate a piece of audio-video equipment and a different type of device.

With reference to FIG. 1, a piece of audio-video equipment 11, such as a consumer television set, is controlled by a hand-held remote control 13 that is provided with the equipment 11 by a common manufacturer. The remote 13 includes a number of functional keys 15, including a key 17 to raise the audio volume from the equipment 11, a key 19 to lower that volume and a key 21 to mute emission of sound from the equipment 11. Others of the keys 15 depend upon the type of audio-video equipment 11 being controlled. If a television set, channel selection keys are included on the remote, among others. If a video tape recorder, keys for controlling operation of the tape, as well as channel selection keys are included. If a video or digital versatile disc (DVD) player, keys are also provided to control operation of the disc. If an audio pre-amplifier, amplifier or receiver, remote keys are included to control various other audio functions. If a satellite receiver, cable interface box, and the like, its remote control often contains sound controlling keys in addition to keys controlling channel selection and other functions of the equipment.

Common to each of these remote controls are sound controlling keys, such as the mute and volume keys 17, 19 and 21. As is well known, operation of a remote control key causes an infra-red signal to be transmitted from an emitter 23 of the remote 13 to a photo-detector 25 of a receiver of the television or other piece of audio-video equipment 11. A different signal is transmitted by the remote 13 for each of its keys. The signal is then decoded within the equipment 11 and the function specified by it is then carried out by that equipment. A difficulty is that different audio-video equipment manufacturers use different infra-red signal protocols and encoding patterns to designate the various functions of the remote controls that are sold with the equipment. The most common signal protocols have previously been described above in the Background. Universal remote controls have, as a result, been made available for controlling two or more pieces of audio- video equipment from different manufacturers. These universal remotes either contain data of a number of different signal protocols and encoding patterns used by various manufacturers, so that the appropriate one or more can be selected by the user, or are programmable from the remote controls that accompany the equipment to be controlled.

Other devices used in the vicinity of audio-video equipment, such as those located in the same room, also emit sounds. One example class of such devices includes toys that talk, play music or generate other sounds through a loudspeaker or other comparable device included in them. The generation of these sounds are often initiated by a pull string, motion sensor within the toy, knob, push button, and the like. Typically, there is no way to conveniently control the level of that sound, once initiated, until a pre-programmed sequence has been completed. Such toys include stuffed animals, dolls, miniature vehicles and others. Another class of sound emitting devices in the home include appliances, such as ovens, washing machines, timers and the like. These are usually silenced, or their volume adjusted, only by the user walking up to them individually and operating their front panel controls. One such device 27 is generally illustrated in FIG. 1. The device 27 is not an audio-video device that is sold with a remote control but rather is some other type of device, such as a toy, music synthesizer, home appliance and the like, that emits sounds through an internal loudspeaker 29 or other generator of sounds. The device 27 typically generates sounds from a simple internal oscillator or more complicated sound synthesizer, rather than reproducing actual sounds that have been recorded or received over a sound channel in the way that the piece 11 of audio-video equipment reproduces sound.

Figure 2:
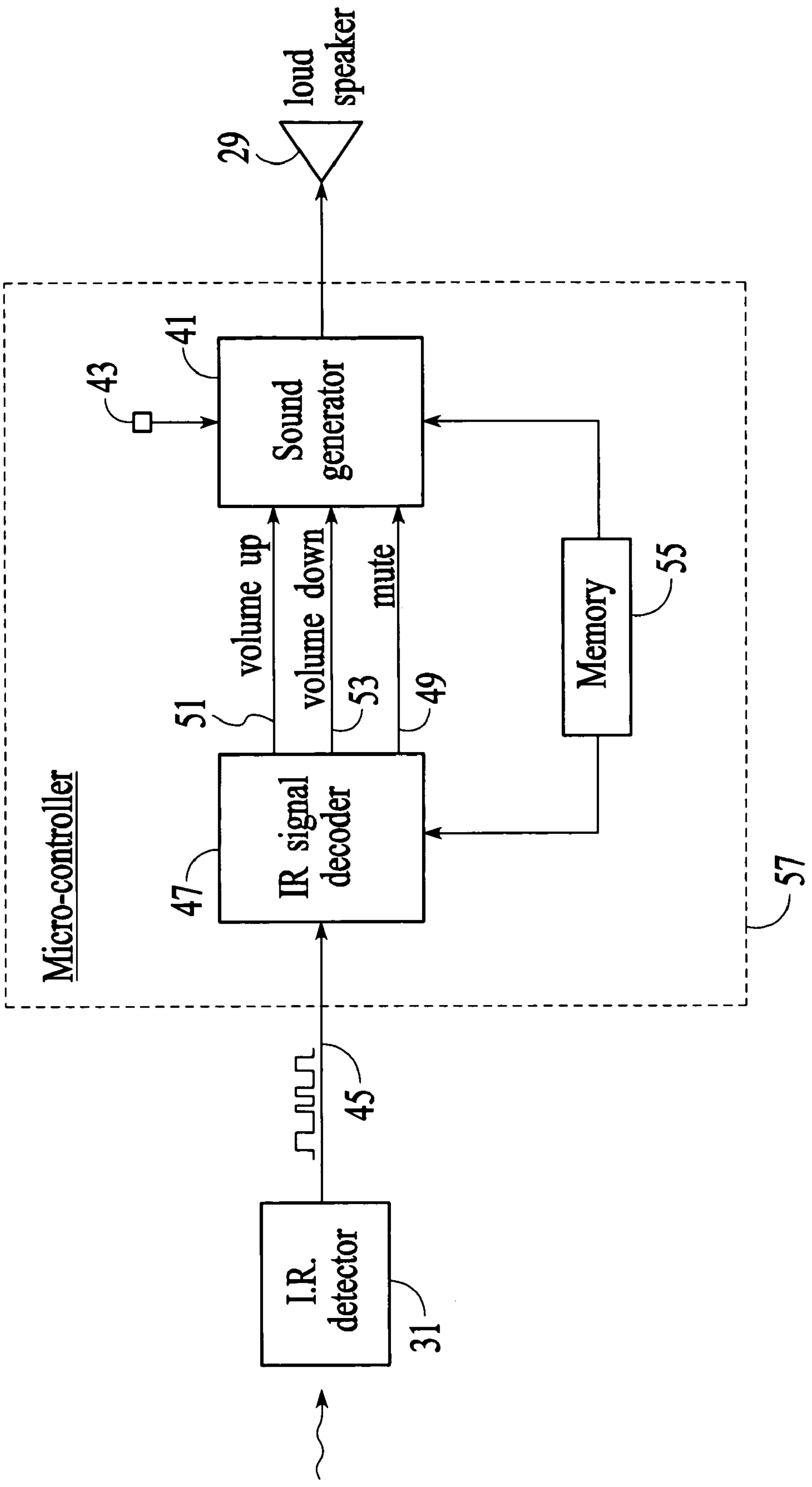
FIG. 2 is a block diagram of an example universal remote control receiver within the non-audio/video device of FIG. 1.

According to a principal aspect of the present invention, a photo-detector 31 is added to individual ones of such devices to receive infra-red signals from remote controls such as the remote 13, along with internal circuitry that decodes received infra-red signals and controls the sound source of the device 27 according to the function of the remote key that has been depressed. An example electronic system within the device 27 is illustrated in FIG. 2, including a sound generator and means for controlling the sound generator by infra-red signals emitted from remote controls having any one of a wide variety of known protocols and/or signal encoding patterns. When the equipment 11 and the device 27 are both within the range of the remote control 13, such as when all are in the same room, operation of the mute button 21 will mute both at the same time. This is particularly convenient, for example, when the user needs to silence the sound sources in a room, such as to take a telephone call or converse with another in the room. Similarly, the volume of both the equipment 11 and device 27 are simultaneously controllable by operation of the remote volume keys 17 and 19. Further, other sound control functions provided by commercially available remote controls (not shown) can be included in the device 27.

With reference to FIG. 2, a sound generator 41 is included within the device 27 to drive its loud speaker 29. The nature of the sounds generated, their initiation, duration and other characteristics are controlled by one or more switches 43 within the device 27. Such a switch can be manually operable, such as by a push-button or knob, or may be, particularly in the case where the device 27 is a toy, operated in response to motion of the device 27, movement of some part of the device, by a timer or even in response to a loud external sound such as hand clapping.

The volume of the sound generator 41 is controlled, in this example, by infra-red signals received by the photo-detector 31. An electrical signal output of the photo-detector 31, in a line 45, is applied to a signal decoder 47. The received remote infra-red signal is decoded to determine whether it specifies whether the sound should be muted, in which case a control signal in a line 49 is applied to the sound generator 41 to mute it. Similarly, when a volume-up signal is decoded, a signal in a line 51 causes the volume of sound generated by the circuit 41 through the loudspeaker 29 to be increased. Similarly, a volume-down infra-red signal is decoded to apply a signal in a line 53 to reduce the volume of the sound being generated. Therefore, operation of the key 17 of the remote 13 (FIG. 1), operating any of a number of infra-red signal protocols and/or encoding patterns, is decoded to provide a control signal in the line 51 (FIG. 2), the key 19 a control signal in the line 53, and the key 21 a control signal in the line 49.

A memory 55 stores data of the different protocols and encoding patterns of infra-red signals that the decoder is given the ability to decode. Depending upon the type of sound being generated by the sound generator 41, data may also be stored in the memory 55 to control that process. Often, the sound generator 41 is a simple oscillator operating at a single or very few frequencies, in which case little or no data is required to be stored in the memory 55. In other cases, the sound generator 41 synthesizes more complicated sounds including speech or music, in which case data is stored in the memory 55 for controlling that process. In a specific implementation example, the sound generator 41, the decoder 47 and the memory 55 may be included on a single integrated circuit chip 57. A commercially available micro-controller chip, such as part no. Z86C08 of Zilog, Inc., assignee of the present application, is most conveniently programmed to carry out the sound generation and decoding functions. Alternatively, a decoder can be implemented with such a chip for controlling an independent sound source provided within the device 27.

Figure 3:
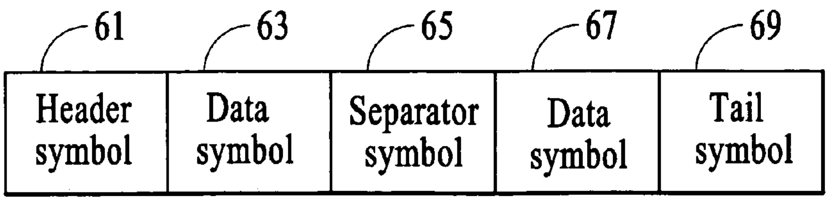
FIG. 3 illustrates the format of one type of infra-red signal generated by the remote control of FIG. 1 and received by the universal receiver of FIG. 2.

The function of the decoder 47 is described with respect to an example protocol of an infra-red signal generated by the remote 13. Referring to FIG. 3, a typical signal structure is illustrated. An initial one or more pulses forms a header 61, followed by a series of pulses of data 63 with a pattern unique to the function specified by the key that has been pressed to generate the signal. One or more pulses 65 then indicates an end of the data. Optionally, the data is then repeated at 67, followed by one or more pulses 69 indicating an end of the signal. These different components are detected by the decoder 47.

Figure 4:
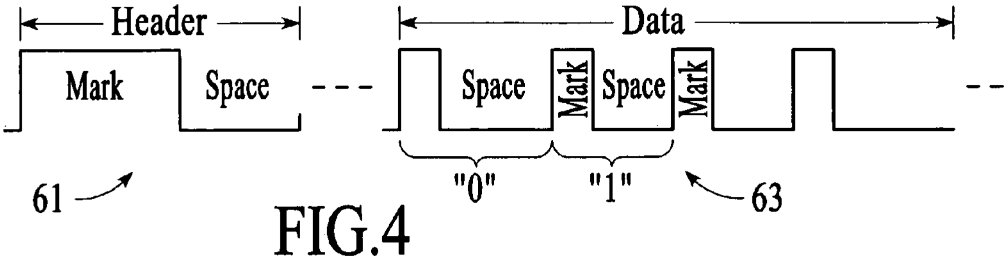
FIG. 4 shows an example pulse pattern of the type of infra-red signal shown in FIG. 3.

With reference to FIG. 4, example pulses are shown according to the PPM signal protocol that has previously been discussed in the Background. The header 61 includes one relatively long mark pulse followed by a relatively long space. The data 63 are formed of a series of pulses (marks) of constant duration with spaces between them that are either one duration or another. A mark followed by the longer space is designated as a binary “0” and a mark followed by the shorter space is designated as a binary “1”, as shown in FIG. 4. There are enough pulses in a data symbol to represent eight bits of data, in this particular example. A unique binary signal represents each of the plurality of functions that may be commanded by pushing each of the remote keys. One particular combination of the seven bits represents the sound mute function, for example, another for volume-up and yet a different combination of bits for volume-down.

Figure 5:
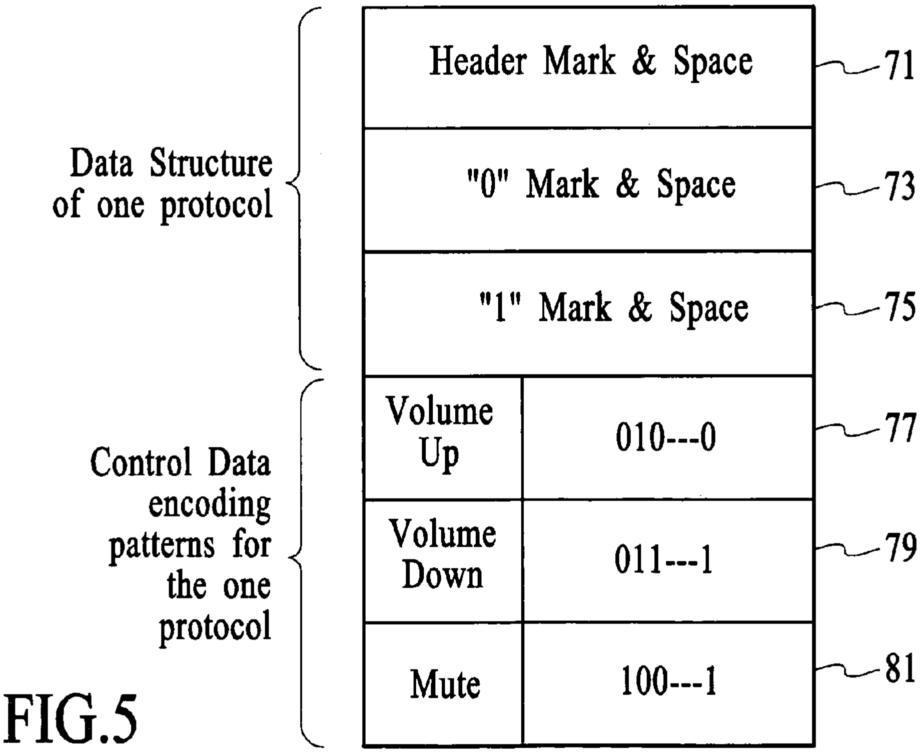
FIG. 5 illustrates an example table stored in the memory of the universal receiver of FIG. 2 that contains data of the characteristics of one type of infra-red signal protocol and encoding pattern.

FIG. 5 illustrates the contents of one record stored in the memory 55 (FIG. 2) of one brand’s implementation of the PPM protocol. This record includes a field 71 containing mark and space time durations of the header 61. Another field 73 contains the duration of the mark and space of the data 63 that represent a binary “0”, and a field 75 that of a binary “1”. These three fields 71, 73 and 75 represent the signal protocol used by one brand of audio-video equipment. The bit patterns for the individual key functions of that particular protocol are then also stored as part of the record. A field 77 stores the bit pattern for a volume-up function, for example, a field 79 for volume-down and a field 81 for mute. Of course, if it is desired to decode additional functions within the device 27, the record of FIG. 5 is expanded to include data patterns of those functions in additional fields. Many records of the type of FIG. 5 are stored in the memory 55 (FIG. 2) with different data of protocols of other brands.

Figure 6:
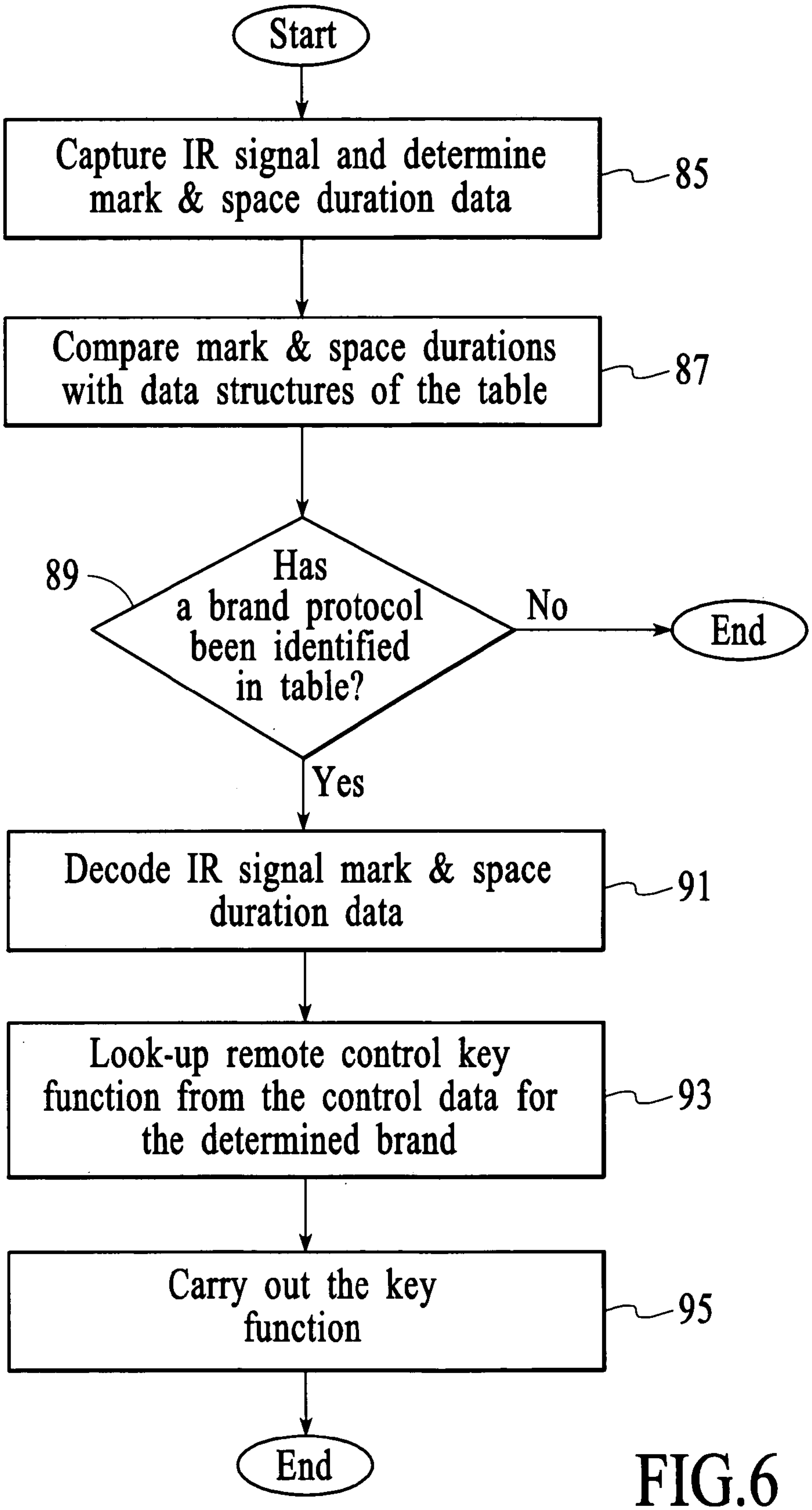
FIG. 6 is a flow diagram that illustrates one example of the operation of the universal receiver of FIG. 2 to identify the type of infra-red signal being received and decode that signal.

FIG. 6 illustrates an example process whereby the decoder 47 (FIG. 2) first determines the protocol of an infra-red signal received from the remote control 13 (FIG. 1), decodes the data contained within the signal and then identifies the function (sound volume up, down or mute, for example) represented by that data. In a step 85, the complete infra-red signal, such as that illustrated in FIG. 3, is received and temporarily stored. The durations of the marks and spaces of the signal, particularly in the header and data symbols, are determined. In a next step 87, these determined mark and space durations are compared with those of the signal protocol records stored in the memory 55. One such record is that illustrated in FIG. 5. If the mark and space durations of the header and data symbols match those of fields 71, 73 and 75 of the record of FIG. 5, for example, then that record is identified as providing the encoding patterns of the signal data. If no such record is identified, the process is terminated and the device 27 is unable to act upon the received infra-red signal.

When a brand protocol record is determined to exist in the memory 55, however, a next step 91 converts the mark and space durations of the infra-red signal into binary bits of data, usually seven bits for the PPM protocol. The contents of the fields 73 and 75 of the brand protocol record of FIG. 5 are used for this. A next step 93 then determines which of the fields 77, 79, 81, and any additional functional fields that are included, contains that bit pattern. The function of the field containing the decoded bit pattern is thereby determined. A next step 95 causes a signal to be sent from the decoder 47 to the sound generator 41 (FIG. 2) to carry out the specified function.

Referring again to FIG. 1, some types of the remote control 13 contain buttons (not shown) for selecting one piece of various audio-video equipment at a time. One unique infra-red signal protocol is usually sent to match that recognized by a television, for example, when a “TV” button is pushed on the remote, another signal protocol when a “VCR” button is pushed, and so forth. When this capability is present, a spare one of these buttons can be dedicated to the toy or other sound emitting device desired to be controlled, in a manner not to affect the audio-video equipment that is in the same room or otherwise within range of the remote control. The universal receiver 57 (FIG. 2) within the device is able to respond to the infra-red signals generated by the remote while the audio-video equipment within its range does not respond. The existing remote control then takes on a dedicated function to control such a non-audio/ video device, without the manufacturer of the device having to supply a remote control. However, if that same remote is used to control the TV, VCR or other audio-video equipment within its range that may be selected by pushing the appropriate remote button, the universal receiver 57 of the other device 27 will also respond, as described above.

Although the various aspects of the invention have been described with respect to specific exemplary embodiments, it will be understood that the invention is entitled to protection within the full scope of the appended claims.

It is claimed:

1. Apparatus other than audio-video equipment, comprising:

a photo-detector adapted to receive infra-red radiation and generate an output signal, a memory simultaneously storing a plurality of records that individually contain characteristics of a different one of a plurality of infra-red signal pattern protocols emitted by a plurality of different types of remote controls of audio-video equipment, the individual records additionally including a link within the record of one or more signal patterns emitted by one of the remote controls with at least one specific function, a signal decoder connected to receive the photo-detector output and to first identify a match between the signal pattern protocols of one of the stored records and then to identify a match between a pattern of the output signal and one of the signal patterns stored in the identified record for generating a control signal corresponding to the specific function to which the matched signal pattern is linked within the identified record, and a component of said apparatus other than audio-video equipment connected to receive the control signal and perform the specific function.

2. Apparatus according to claim 1, wherein the apparatus component includes a sound source and the specific function controls the sound source.

3. Apparatus according to claim 2, wherein the specific audio-video function of the matched signal pattern includes muting the sound of audio-video equipment and the specific function includes muting the sound source of said apparatus other than audio-video equipment.

4. Apparatus according to claim 2, wherein the specific audio-video function of the matched signal pattern includes raising or lowering the sound level of audio-video equipment and the specific function includes raising or lowering the level of the sound source of said apparatus other than audio-video equipment.

5. Apparatus according to any one of claims 1–4, wherein said apparatus other than audio-video equipment is installed within a toy.

6. A method of remotely controlling a device other than audio-video equipment to perform one or more functions, comprising:

simultaneously storing a plurality of records in the device other than audio-video equipment of characteristics of signals emitted by a plurality of different types of remote controls of audio-video equipment, the individual records storing one or more signal patterns that are individually linked within the record with one of the one or more functions to be performed by the device, before comparing the signal received by the device from the remote control with the signal patterns of any of the records, comparing a signal received by the device from one of the different types of remote controls with the records stored in the device to identify one of the records corresponding to the type of remote control emitting the received signal, thereafter comparing the signal received by the device from the remote control with the one or more signal patters within the identified record in order to identify a signal pattern within the identified record having that of the received signal, and executing one of the one or more functions in the device that is linked in the identified record with the identified signal pattern.

7. The method of claim 6, wherein the device other than audio-video equipment is installed within a toy.

8. The method of claim 7, wherein the one or more functions of the device other than audio-video equipment includes control of a sound generator therein.

* * * * *

UNITED STATES PATENT AND TRADEMARK OFFICE

CERTIFICATE OF CORRECTION

PATENT NO. : 7,042,366 B1
APPLICATION NO. : 09/655733
DATED : May 9, 2006
INVENTOR(S) : Mui et al.

It is certified that error appears in the above-identified patent and that said Letters Patent is hereby corrected as shown below:

Column 8, line 29, “patters” should be changed to --patterns--.

Signed and Sealed this

Fourth Day of July, 2006

JON W. DUDAS
*Director of the United States Patent and Trademark Office*